Dec. 6, 1927. 1,651,862
R. A. BARTHOLOMEW
TRANSMISSION DEVICE
Filed Oct. 9, 1924 2 Sheets-Sheet 2
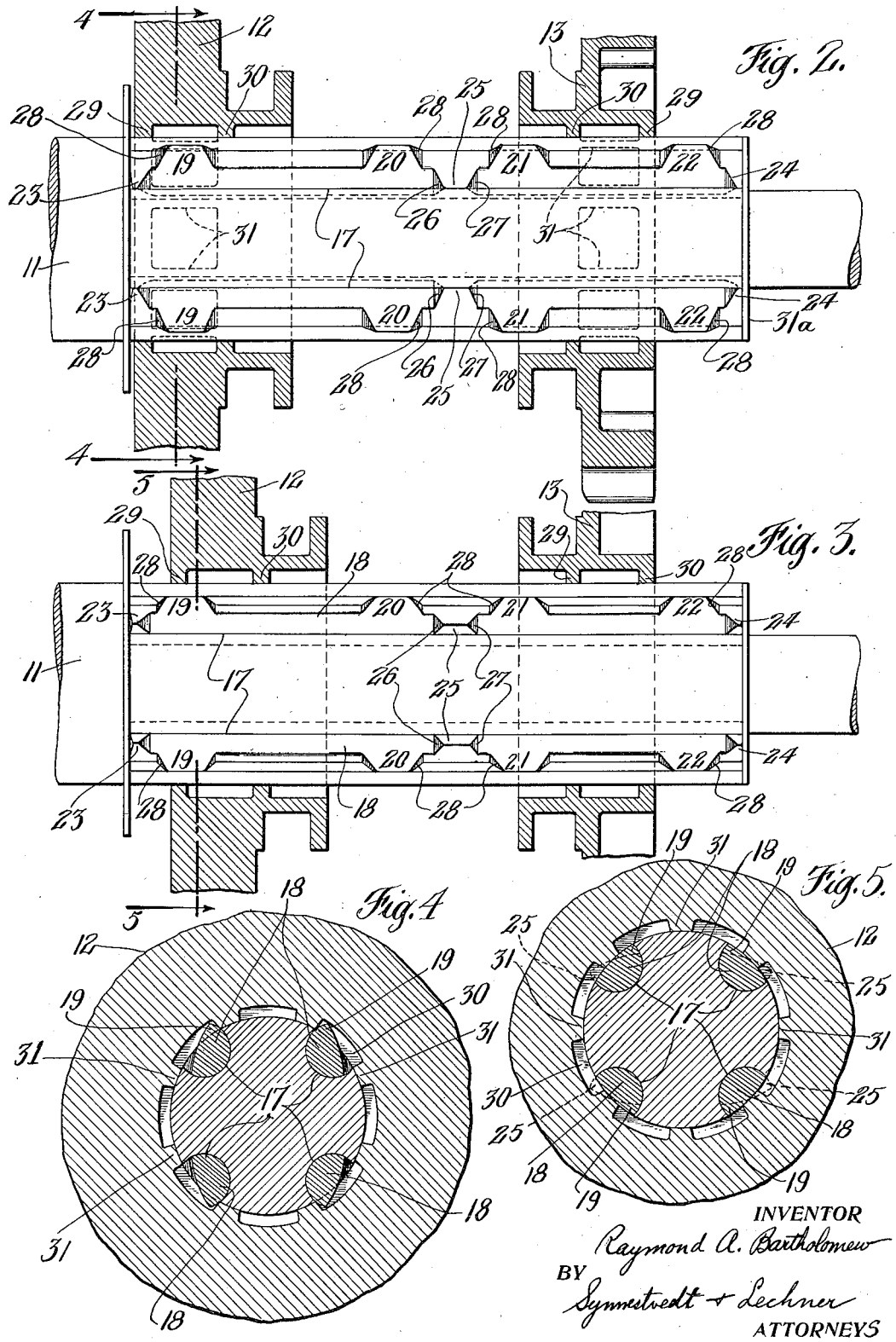
INVENTOR
Raymond A. Bartholomew
BY
Synnestvedt + Lechner
ATTORNEYS Patented Dec. 6, 1927.

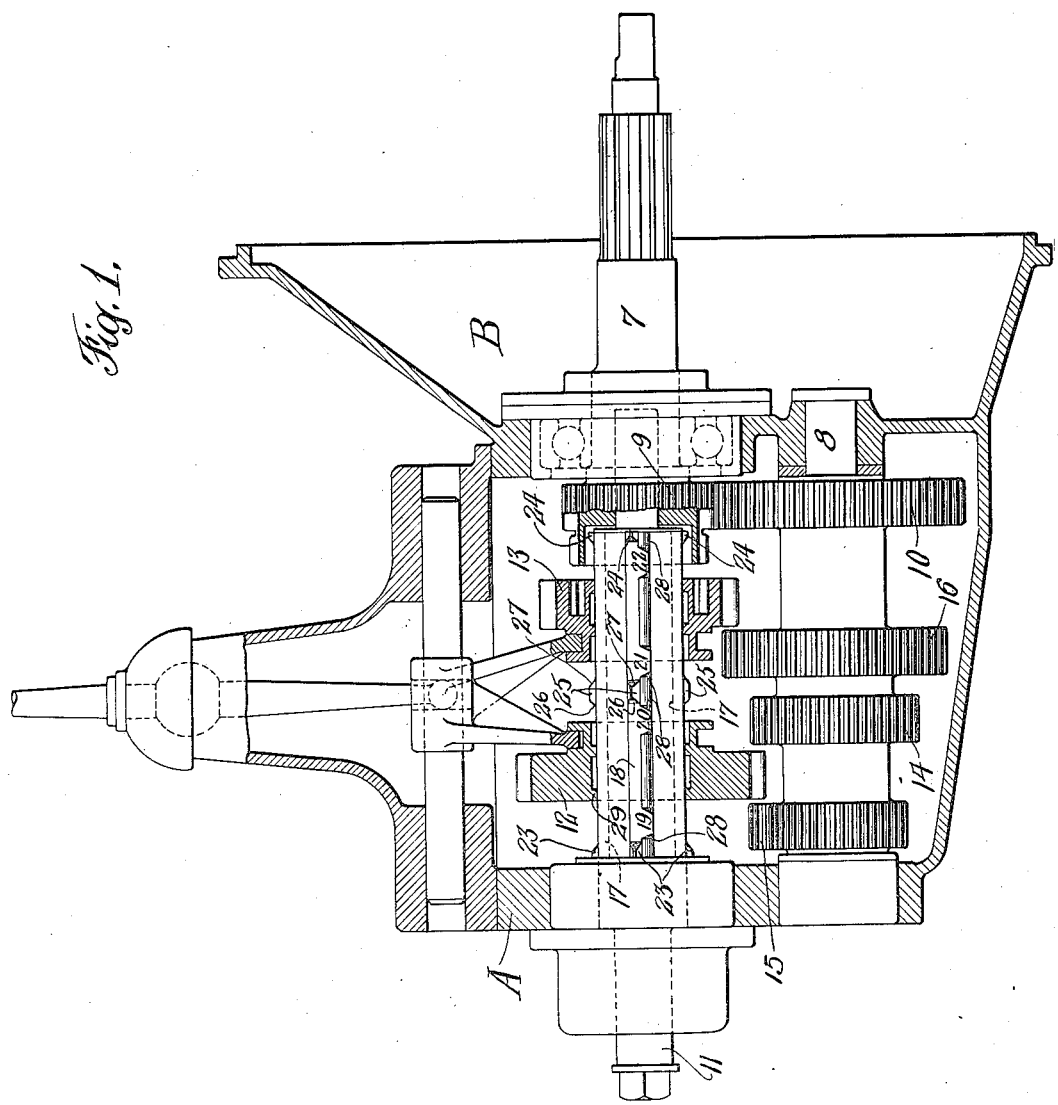

1,651,862

UNITED STATES PATENT OFFICE.

RAYMOND A. BARTHOLOMEW, OF BROOKLYN, NEW YORK.

TRANSMISSION DEVICE.

Application filed October 9, 1924. Serial No. 742,570.

This invention relates to transmissions and is especially useful in connection with gear transmissions, such as employed in automotive drive assemblies.

One of the primary objects of my invention is to overcome clashing of the gears on changing from one speed to another, which is so objectionable in automobiles.

I am aware that it has been heretofore contemplated to provide transmissions in which the gears are always in mesh for the purpose of avoiding such clashing. I propose, however, to prevent clashing in that type of gear transmission in which the gears are brought into and out of mesh with other gears to effect the desired changes of speed.

More specifically, my invention is directed to the obtaining of these results by means of very simple and inexpensive mechanism of fool-proof character and which is absolutely positive and certain in its operation.

I further propose a device in which it is possible to shift the gears at any speed without clashing and to shift from one speed to another indiscriminately without clashing.

How the foregoing, together with such other objects as may hereinafter appear, or are incident to my invention, are realized, is illustrated in the accompanying drawing wherein:

Fig. 1 is a section thru a transmission assembly of a standard type, such as employed in a Hudson car, such assembly however embodying my improvements;

Fig. 2 is a section, on a larger scale, illustrating my improvements and showing the parts in one operative position;

Fig. 3 is a section similar to Fig. 2, showing certain of the parts in an intermediate position;

And Figures 4 and 5 are sections taken respectively on the lines 4—4 of Fig. 2 and 5—5 of Fig. 3.

Referring now to Fig. 1, it is to be understood that the general assembly is only typical of the applications to which my improvement may be put. The reference character A indicates the casing or gear box; the reference character B indicates the usual clutch casing; the reference numeral 7 indicates the shaft adapted to be coupled to the engine shaft thru the medium of the clutch; the reference numeral 8 indicates the counter shaft, in this case, always operatively connected to the shaft 7 by means of the gears 9 and 10; and the reference numeral 11 indicates the driven shaft, adapted to be connected to the propeller shaft of the car. The shaft 11 carries the gears 12 and 13, the former of which is adapted to be shifted to either mesh with the first or low speed gear 14 or with the reverse idler gear 15; while the latter gear i. e. the gear 13, is adapted to be shifted to either mesh with the second speed gear 16 or to internally engage the gear 9 for high speed. The gears 12 and 13 are shifted longitudinally of the shaft 11 by the usual fork arrangement, altho it is to be understood that a mechanical gear shift, such as shown in my copending application Serial No. 516,617 filed Nov. 21, 1921, may be substituted therefor. As thus far described the apparatus is old and is typical only of quite a number of different forms of transmission to which the invention is applicable.

The shaft 11, however, is provided with a plurality of longitudinal grooves 17, such grooves being approximately half rounds. There are four of such grooves, preferably spaced equidistant from one another.

In each groove there is set a locking member 18, also approximately in the shape of a half round. Each locking member is so constructed that its main outer surface is substantially flush with the periphery of the shaft and, in any event, does not project therebeyond. Each locking member has four locking lugs 19, 20, 21 and 22. The locking lugs 19 and 20 and 21 and 22 are, respectively, so spaced from one another that when the respective gear is shifted to a position therebetween, it is in idle or neutral position and is free to revolve about the shaft, or, more properly speaking, the shaft is free to rotate with respect to the gear. When the locking members are in neutral position the locking lugs do not project beyond the periphery of the shaft, but when a locking member is rocked or tilted to locking position, it will project beyond the periphery of the shaft a substantial distance, as indicated in Fig. 4 for example. In Fig. 5 the locking members are shown in neutral or inoperative position. Adjacent to the lug 19 of each locking member there is a cam member 23, a similar cam member 24 being provided for each locking member adjacent the locking lug 22 thereof. Between the lugs 20 and 21 of each locking member, there is an upstanding lug 25 having cam surfaces 26 and 27 on opposite sides thereof. The lugs 19, 20, 21 and 22 are along one longitudinal edge of a locking member and the cam lugs 23, 24 and 25 are disposed on the opposite longitudinal edge. The locking lugs and the cam lugs are so disposed that when the rocking locking members are in inoperative position with the locking lugs flush with the periphery of the shaft, the cam lugs will be projecting beyond the periphery of the shaft, as indicated in dotted lines in Fig. 5. When, however, the rocking locking members are shifted to locking position as indicated in Fig. 4, with the locking lugs projecting beyond the periphery of the shaft, then the cam lugs are flush with the periphery of the shaft. Each locking lug has a cam surface 28, on the edge or side adjacent to the respective cam lugs.

Each of the gears 12 and 13 have their inner periphery cut away so as to leave two spaced annular rings or flanges 29 and 30, and extending between these flanges are a plurality of teeth 31 disposed equidistantly from one another around the inner periphery of the gear.

The operation of the apparatus is as follows: On reference to Fig. 1 it will be observed that both the gears 12 and 13 are in neutral position, that is to say, they occupy a position between the locking lugs, where they are free to rotate on the shaft 11 or the shaft is free to rotate with respect to the gears. If now it is desired to shift into reverse, the gear 12 will be moved longitudinally of the shaft 11 to the left, whereupon it will first mesh with the reverse idler gear 15, without clash for the reason that while the shaft 11 may be rotating the gear may be stationary as will be the idler gear 15 for the reason that the clutch is disconnected. After the initial meshing has taken place and on continued movement of the gear 12 to full mesh position, the flange 29 will engage the cam lug 23 of each rocking locking member, and as the movement is continued, the cams 23 will be depressed flush with the periphery of the shaft 11 bringing the lugs 19 on each locking member to the position shown in Fig. 4, whereupon they will engage with teeth 31 of the gear locking the same against rotary movement. In this connection it will be observed on inspection of Fig. 4 that the pairs of the rocking locking members are oppositely arranged so that two of them will engage teeth 31 to prevent rotation relative of the shaft in one direction while the remaining two will engage teeth 30 to prevent relative rotation in the opposite direction. It will be seen that further movement to the left of the gears 12 is prevented by the fit of the locking lugs 19 within the two flanges.

Now on going out of reverse to neutral position or to first speed, the gear 12 is moved to the right, whereupon the flange 29 will come into engagement with the cam surfaces 28 on each of the locking lugs 19 which operates to depress the locking lugs until they are flush with the periphery of the shaft, whereupon the gear is free to be moved to either neutral position or to a position meshing with the gear 14. The action of the gear 12 in depressing the lug 19 and rocking the locking members is to again bring the cam lugs into a position where they may be again engaged by appropriate movement of the gear to establish driving connection between the shaft and the gear. When the gear 12 is moved toward the right, subsequent to initial meshing with the gear 14 and prior to full mesh, the flange 30 will engage the cam surfaces 26 of the cam lugs 25, bringing the locking lugs 20 into locking engagement with the gear 12 as before described.

Precisely the same operation is had when the gear 13 is shifted to its various positions.

In going from low into high directly, for example, the operation would be to first shift the gear 12 to neutral position and then shift the gear 13 forwardly. Since the gear 13 first meshes with the gear 9 before locking occurs, it will be seen that this can be accomplished without clashing. The same is true in going from high into low or from high into second. For the same reason it is possible to shift gears, altho it may not be desirable to do so, without disengagement of the clutch, for the operation then would be to first shift into neutral from which position there would be initial meshing movement before locking occurs.

Endwise displacement of the rocking locking members is prevented by the collar 31$^a$.

It is to be seen from the foregoing that the device is very simple, positive in operation and fool-proof. It is further impossible to shift any of the gears beyond any proper position because of the limiting of movement in either direction by the locking lugs themselves.

I claim:

1. In a gear transmission, a shaft, a rocking locking member carried by the shaft, and a gear slidable and rotatable on the shaft, said member having a cam lug and a locking lug, the cam lug operating to tilt the locking member on movement of the gear in one direction and the locking lug having a cam surface to tilt the member on movement of the gear in the opposite direction.

2. In a gear transmission a drive shaft, a driven shaft, gears revolvable on the driven shaft and movable along said shaft to effect changes of speed, and a cam operated member for establishing and disestablishing driving connection between the driven shaft and any one of said gears operable on shifting the gear to be connected.

3. In a gear transmission a drive shaft, a driven shaft, gears revolvable on the driven shaft and movable along said shaft to effect changes of speed, and a positively acting cam operated means for establishing driving connection between the driven shaft and any one of said gears operable on shifting the gear to be connected.

4. In a gear transmission a shaft, gears revolvable on the shaft and movable therealong, and a positively acting cam operated means for establishing and disestablishing driving connection between said shaft and any one of said gears operable on shifting the gear to be connected.

5. In a gear transmission a shaft, a pair of gears slidable and rotatable on the shaft, a rocking locking member carried by the shaft, said member having cam lugs and locking lugs certain of which are operated on by sliding movement of one gear and others by sliding movement of the other gear for locking the shifted gear to the shaft for rotation therewith.

In testimony whereof, I have hereunto signed my name.

R. A. BARTHOLOMEW.